United States Patent
Townsend

Patent Number: 5,911,434
Date of Patent: Jun. 15, 1999

[54] SIDE IMPACT AIR BAG DEPLOYABLE BETWEEN A VEHICLE BODY AND AN OCCUPANT

[75] Inventor: John A. Townsend, Troy, Mich.

[73] Assignee: Joalto Design Inc., Southfield, Mich.

[*] Notice: This patent is subject to a terminal disclaimer.

[21] Appl. No.: 09/004,551

[22] Filed: Jan. 8, 1998

Related U.S. Application Data

[63] Continuation-in-part of application No. 08/510,514, Aug. 2, 1995, Pat. No. 5,531,470, which is a continuation-in-part of application No. 08/257,080, Jun. 9, 1994, which is a division of application No. 07/912,790, Jul. 13, 1992, Pat. No. 5,378,036.

[51] Int. Cl.$^6$ .................................................... B60R 21/22
[52] U.S. Cl. .................................. 280/730.2; 280/730.1; 280/728.2
[58] Field of Search ..................... 280/730.2, 730.1, 280/728.2, 751, 752; 297/411.32; 296/153

[56] References Cited

U.S. PATENT DOCUMENTS

| | | | |
|---|---|---|---|
| 3,623,768 | 11/1971 | Capener | 297/390 |
| 4,881,778 | 12/1991 | Stephenson et al. | 297/417 |
| 5,106,160 | 4/1992 | Nomura et al. | 297/417 |
| 5,251,931 | 10/1993 | Semchena et al. | 280/730.1 |
| 5,277,441 | 1/1994 | Sinnhuber | 280/730.1 |
| 5,316,336 | 5/1994 | Taguchi et al. | 280/730.2 |
| 5,333,899 | 8/1994 | Witte | 280/730.2 |
| 5,348,342 | 9/1994 | Haland et al. | 280/730.2 |
| 5,458,366 | 10/1995 | Hock et al. | 280/730.1 |
| 5,492,361 | 2/1996 | Kim | 280/730.1 |
| 5,511,850 | 4/1996 | Zoursey | 297/216.11 |
| 5,730,464 | 3/1998 | Hill | 280/743.2 |
| 5,746,443 | 5/1998 | Townsend | 280/730.2 |

FOREIGN PATENT DOCUMENTS

| | | | |
|---|---|---|---|
| 4358943 | 12/1992 | Japan | 208/730.2 |
| 5032149 | 2/1993 | Japan | 280/730.2 |
| 2220620 | 1/1990 | United Kingdom | 280/730.2 |

*Primary Examiner*—Christopher P. Ellis
*Attorney, Agent, or Firm*—Rader, Fishman & Grauer PLLC

[57] ABSTRACT

A vehicle side impact air bag system is disclosed wherein the air bag is located in an outboard armrest. During a collision, the air bag deploys outward away from the occupant and against the vehicle door or side body panel. Preferably, the air bag fills the entire space between the occupant and the door in order to protect the torso, neck and head of the occupant during the collision. The inventive system may be used with a movable door or an adjacent portion of the vehicle body. Various embodiments are disclosed, including pivotably attaching the armrest to the seat, removably attaching the armrest to the seat, attaching the armrest to the floor, forming the armrest in the floor, and attaching the armrest to the door or vehicle body.

1 Claim, 8 Drawing Sheets

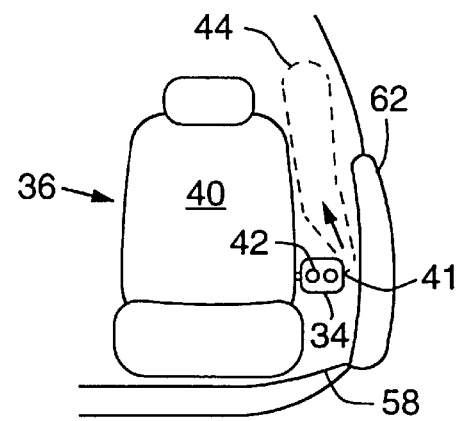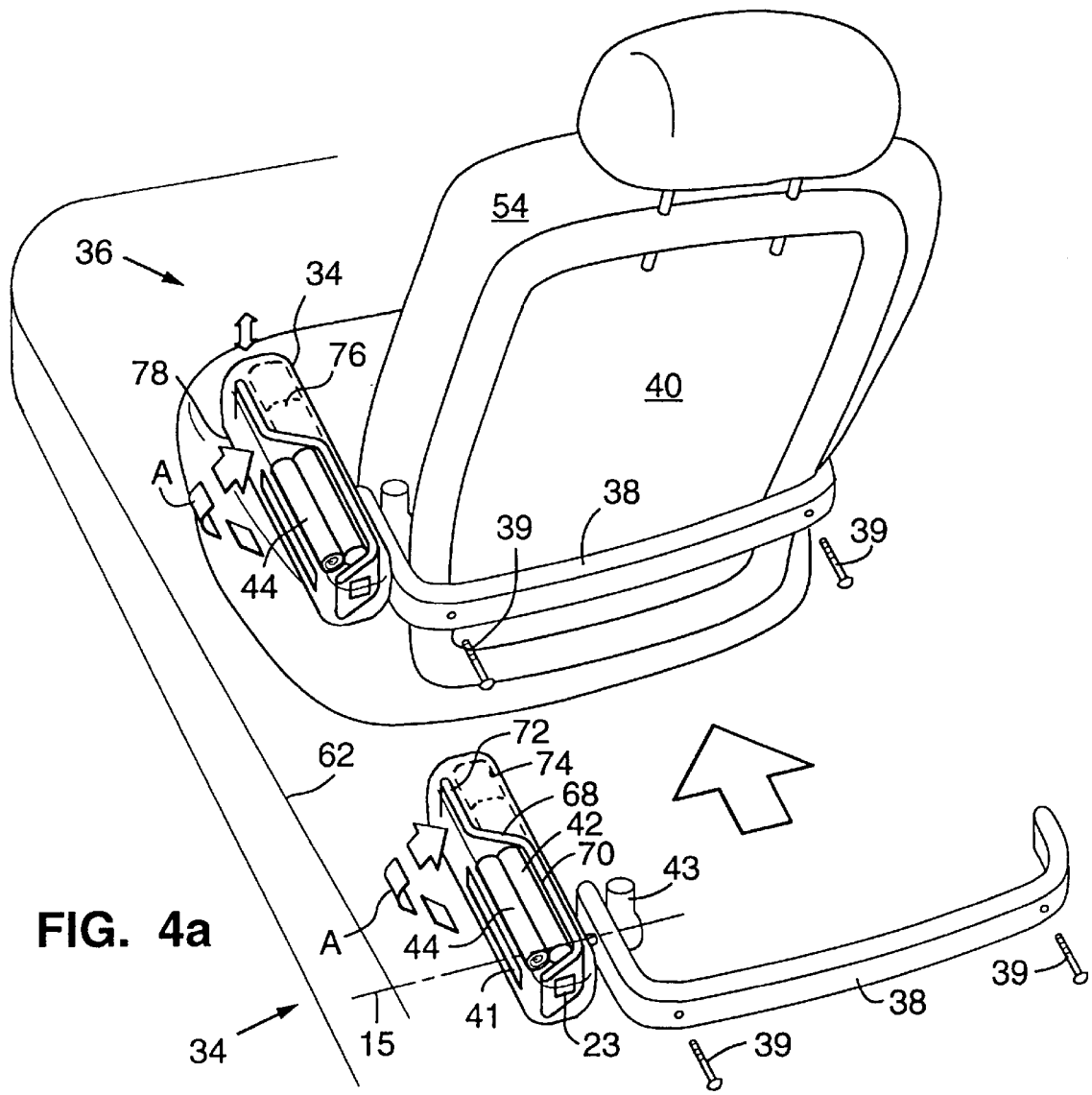

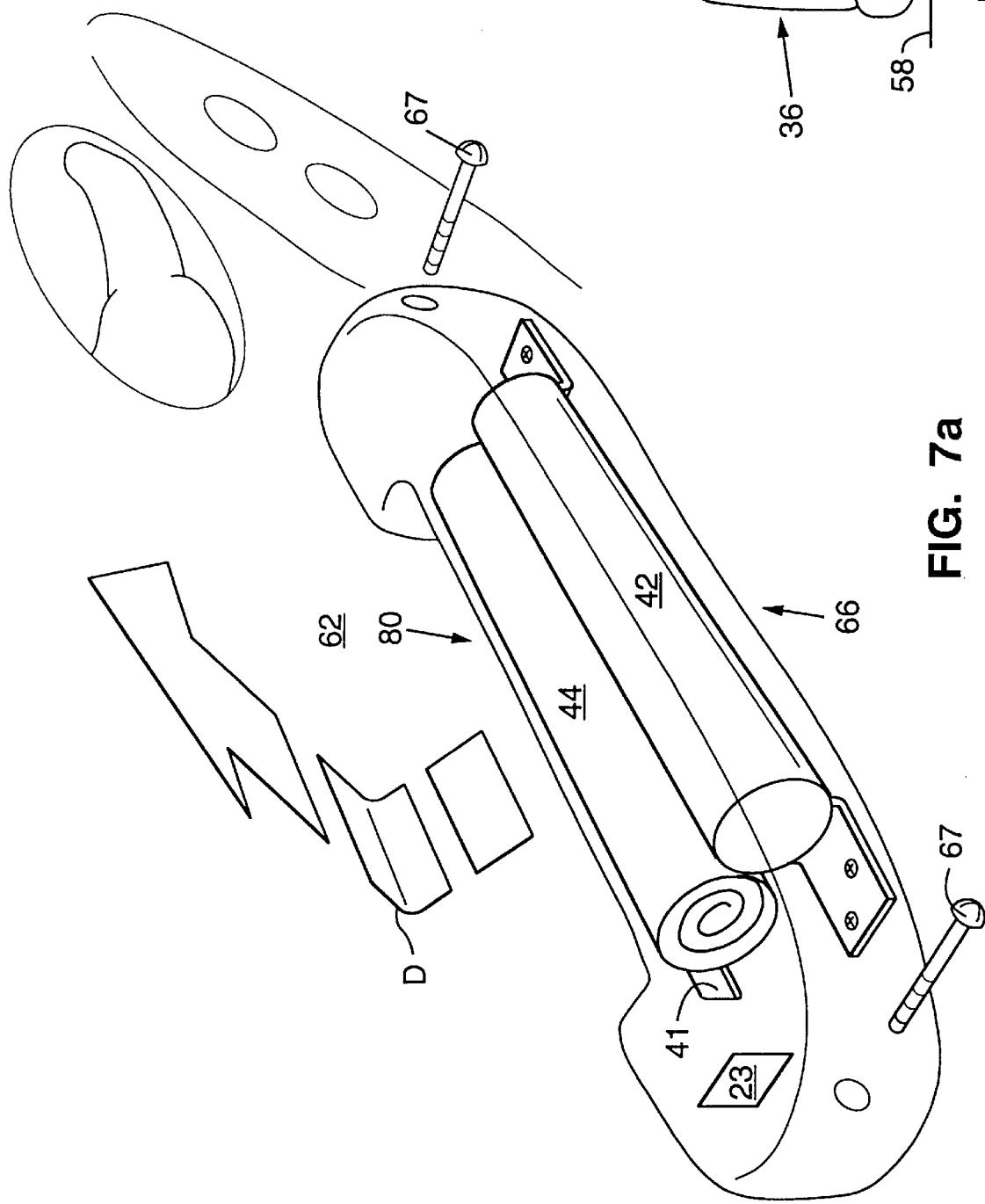

SIDE IMPACT AIR BAG DEPLOYABLE BETWEEN A VEHICLE BODY AND AN OCCUPANT

This is a continuation-in-part of application Ser. No. 08/510,514, filed Aug. 2, 1995, now U.S. Pat. No. 5,531,470 which is a continuation-in-part of application Ser. No. 8/257,080, filed Jun. 9, 1994, pending, which is a divisional of application Ser. No. 07/912,790, filed Jul. 13, 1992, U.S. Pat. No. 5,378,036.

BACKGROUND OF THE INVENTION

1. Field of the Invention

The present invention relates to restraint systems in vehicles, and in particular to inflatable "air bag" systems deployable between an occupant and a vehicle door or body during a side impact.

2. Discussion of the Prior Art

Inflatable air bags used to protect vehicle occupants during a collision are well known in the art of restraint systems. Typically, these devices are located in the steering wheel or instrument panel and deploy in the event of frontal collision.

It has also been previously proposed to locate air bags on the outboard side of vehicle occupants to absorb energy during a side impact, or during a collision having at least a lateral component. Various mounting locations have been proposed, including locating the air bag in the back rest portion of the seat, the seat bottom, a door panel, a door mounted armrest, or in the vehicle roof above the door. From these positions, the air bag is able to inflate in the area between the occupant and the door.

During a collision of sufficient energy, a impact sensor triggers a gas generator which rapidly inflates the air bag. Because the air bag must fill so rapidly in order to protect the occupant, its operation is essentially a contained explosion. As such, injuries can occur to the occupant, aside from the collision itself, when the air bag is normally deployed. In designing air bag systems, a balance must be struck between ensuring that the air bag deploys quickly enough to protect a vehicle occupant during a high speed collision, and reducing the risk of injury due to a rapidly inflating air bag.

The design challenge becomes more difficult for side impact air bag systems. Compared to a frontal impact, there is very little time or distance between a side impact and intrusion upon the occupant. Unlike a frontal impact, there is essentially no time or distance for energy to be absorbed in crumple zones of the vehicle or for the impact to travel through the vehicle structure before reaching the occupant. An air bag must inflate even more rapidly in a side impact than in a frontal impact in order to cushion the occupant from the impact and help protect against physical intrusion into the seating area. There is also much less room beside an occupant to deploy an air bag, as opposed to in front of a seated occupant. Therefore, side impact air bags inherently afford less protection from collision and greater exposure to deployment injuries than do standard air bags for frontal collisions. Because of this, side impact air bag location and deployment direction are critical design criteria.

Air bags located in door armrests or panels have a number of drawbacks. These types of configurations typically require the air bag to deploy directly toward the occupant's head or torso, much like a front mounted air bag, but with less distance between the stowed air bag and the occupant and less time for deployment. This increases the risk of injury due to deployment.

In order to protect the occupant's head during a collision, a separate air bag must deploy from the roof or alternatively the arm rest mounted air bag must extend from the occupant's lower torso up to his or her head when the air bag is inflated. This long distance requires more inflation time and or a more violent burst of gas to inflate, also increasing the risk of injury.

When extending up towards the occupant's head from the armrest, the air bag may snag or get caught up in the seat, the occupant, or his or her clothing. A more forceful inflation may be required to insure that the air bag fully extends in the narrow area between the occupant and the door. In this configuration, the air bag inflates into the side of the occupant's lower rib cage. This violent explosion of the expanding air bag not only poses a danger to the rib cage, but also pushes the occupant's outside arm upward, which can also cause a serious injury or affect the full deployment of the air bag.

Another problem associated with an air bag mounted in the door armrest or panel is its inability to remain optimally positioned between the occupant and the door or side of the vehicle. Because the occupant typically can adjust the seat in a variety of directions, the air bag must be made larger to cover all of the possible seat positions. Otherwise, extremities of the occupant will not be protected in certain seat positions. Even with a larger air bag, the cushioning may not be accurately focused on the occupant, and the above mentioned problems such as deployment time, deployment force, and snagging are exacerbated.

An air bag mounted in a door armrest is also susceptible to displacement during a collision. When a second vehicle intrudes into the door structure of the first vehicle, the position or orientation of the air bag in the door of the first vehicle may be disrupted enough to cause improper deployment of the air bag. For instance, the air bag may be pushed into the vehicle or even into the occupant's outer side before it can properly deploy.

Some of the above problems can be solved by locating the side impact air bag in the seat back or bottom cushion. In these locations the air bag moves with the occupant when the seat is adjusted so the air bag remains optimally focused on the occupant and does not have to be any larger than necessary. The air bag is also farther away from the impact, giving it more time to deploy. However, in these locations the air bag is deployed directly adjacent to the occupant, increasing the risk of injury. The possibility of objects interfering with proper air bag deployment is also a problem. During an accident, the occupant may block or partially obstruct the initial deployment of the air bag, or it may become snagged on the seat, armrest, interior door surface or restraint belt. Also, when the air bag is mounted in the seat bottom, it has a longer distance to travel to become fully deployed than an air bag mounted in a door armrest or panel.

What is needed, and is lacking in the prior art, is a side impact air bag system which deploys the air bag from a location central to the occupant, a location that remains centrally focused on the occupant even when the seat position is shifted, and deploys in such a manner that both the risk of injury due to deployment and the possibility of the air bag snagging on the occupant or adjacent objects are minimized.

SUMMARY OF THE INVENTION

In accordance with one aspect of the present invention, an air bag arranged to deploy in the event of a side impact is provided within a pivotally mounted armrest located on the outboard side of a vehicle seat, so as to be centrally located with respect to the outboard side of a vehicle occupant.

In accordance with another aspect of the present invention, the armrest is connected to and is movable with the seat so as to remain centrally focused on the occupant over a wide range of seat adjustment positions.

In accordance with yet another aspect of the present invention, the air bag system is configured to deploy away from the vehicle occupant, so as to significantly reduce the chance of a deployment injury.

In accordance with still another aspect of the invention, the air bag system is configured to outwardly deploy against a generally smooth interior surface of a vehicle door. As there is no armrest located on the door, the air bag will not hang up on the armrest or on the occupant's arm when deploying.

In the preferred embodiment, the armrest is pivotally mounted to the outboard side of the seat back and is upwardly retractable along side of the seat back to allow easy entry for the vehicle occupant. The armrest is manually or automatically lowered into a operative position parallel to the seat bottom when in use. A cover panel is hingedly attached to the outboard side of the armrest, and opens during a collision to expose an aperture in the arm rest through which the air bag deploys. Instead of a movable cover over the aperture, seat upholstery fabric can be installed over the aperture, as the force of the expanding air bag is sufficient to push through the fabric when deploying.

Advantages to an outwardly located armrest being attached to the seat, as opposed to being attached to the door, are disclosed in original application Ser. No. 07/912,790, now U.S. Pat. No. 5,378,036, issued Jan. 3, 1995, to John A. Townsend and entitled IMPROVEMENTS IN SLIDING AUTOMOBILE DOOR, incorporated herein by reference. These advantages include being able to automatically present a restraint belt to an occupant, having the armrest optimally positioned for use regardless of the adjustment of the seat position, providing optimally located passive protection from side impact such as a progressively deformable bolster, actuating the opening or closing of a vertically sliding door with the armrest, and allowing the entire seat and restraint system to be manufactured and installed in the vehicle as a single, integrated unit.

In a first alternative embodiment, the inventive armrest and air bag combination is provided in a self contained unit that can be removably attached to almost any type of existing vehicle seat.

In a second alternative embodiment, the inventive armrest and air bag combination is provided in a self contained unit that is fastened to the vehicle floor adjacent to the outboard side of the seat.

In a third alternative embodiment, the inventive armrest is formed into the vehicle floor adjacent to the outboard side of the seat.

In a fourth alternative embodiment, the inventive armrest is attached to the vehicle door. In this embodiment, and preferably in all of the embodiments, the air bag deploys outward against the inside surface of the door and expands upward along the inside surface of the door.

BRIEF DESCRIPTION OF THE DRAWINGS

FIG. 4a is a perspective view showing a first alternative embodiment, with the armrest shown removed from and attached to the seatback and the skin of the armrest shown semi-transparent to enable internal viewing of its structure.

FIG. 4b is a reduced front elevational view showing the first alternative embodiment.

FIG. 7a is a perspective view showing a fourth alternative embodiment, with the skin of the armrest shown semi-transparent to enable internal viewing of its structure.

FIG. 7b is a reduced front elevational view showing the fourth alternative embodiment.

DETAILED DESCRIPTION OF THE PREFERRED EMBODIMENT

Figure 1:
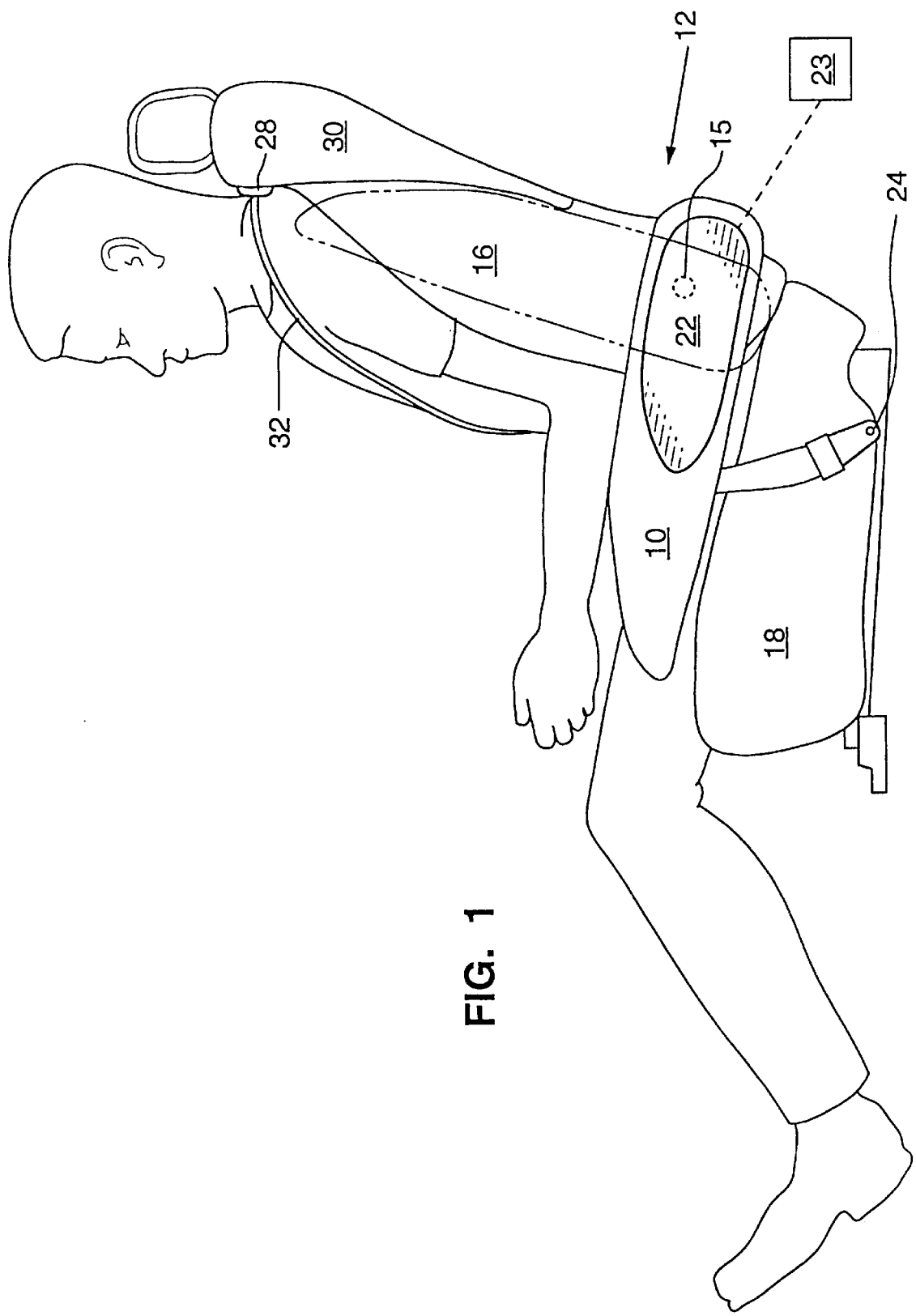
FIG. 1 is a side elevational view showing the inventive armrest in its operative position with the air bag stowed (and showing the armrest in a retracted position in phantom line.)
Figure 2:
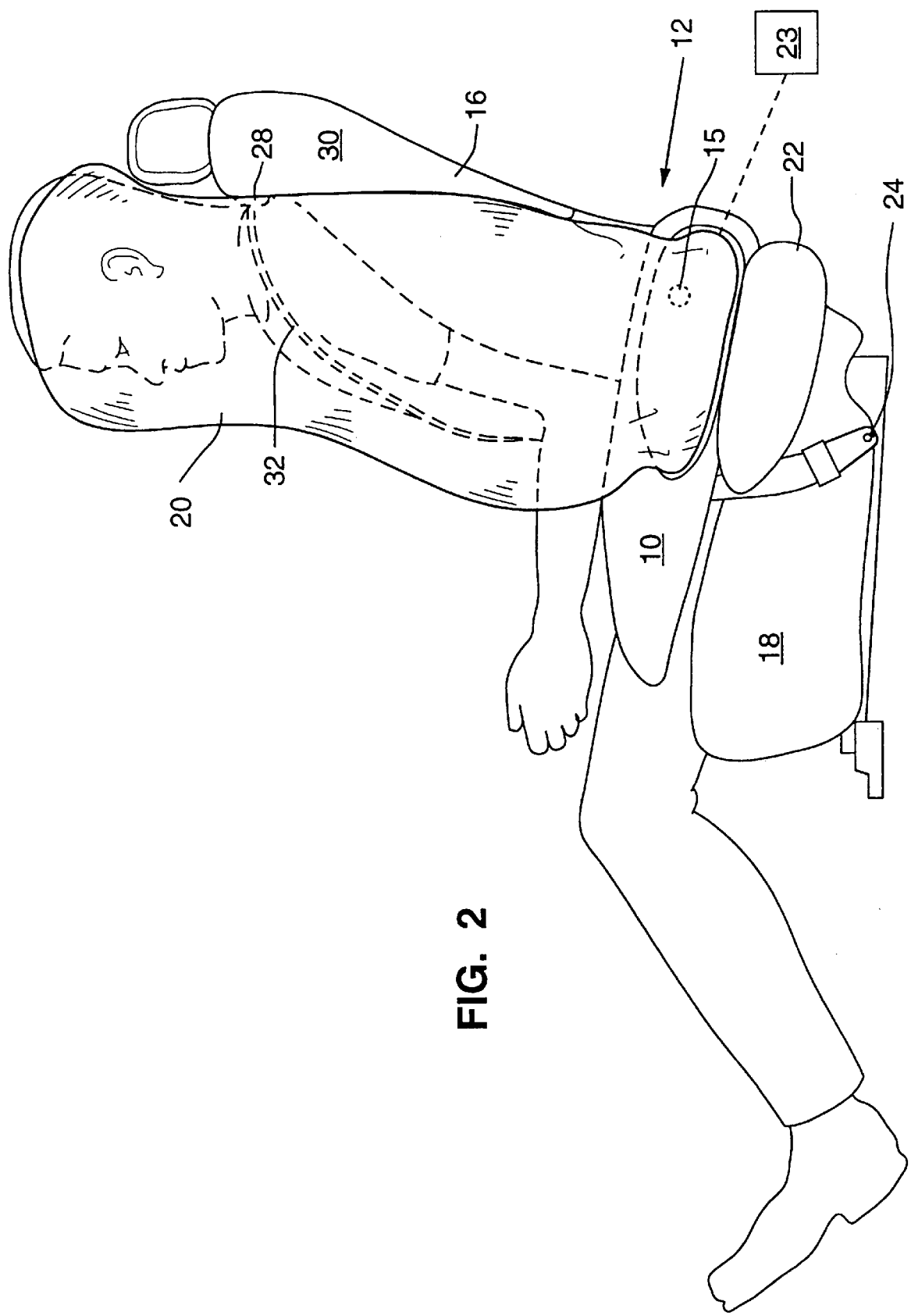
FIG. 2 is a side elevational view showing the inventive armrest with the air bag deployed.
Figure 3:
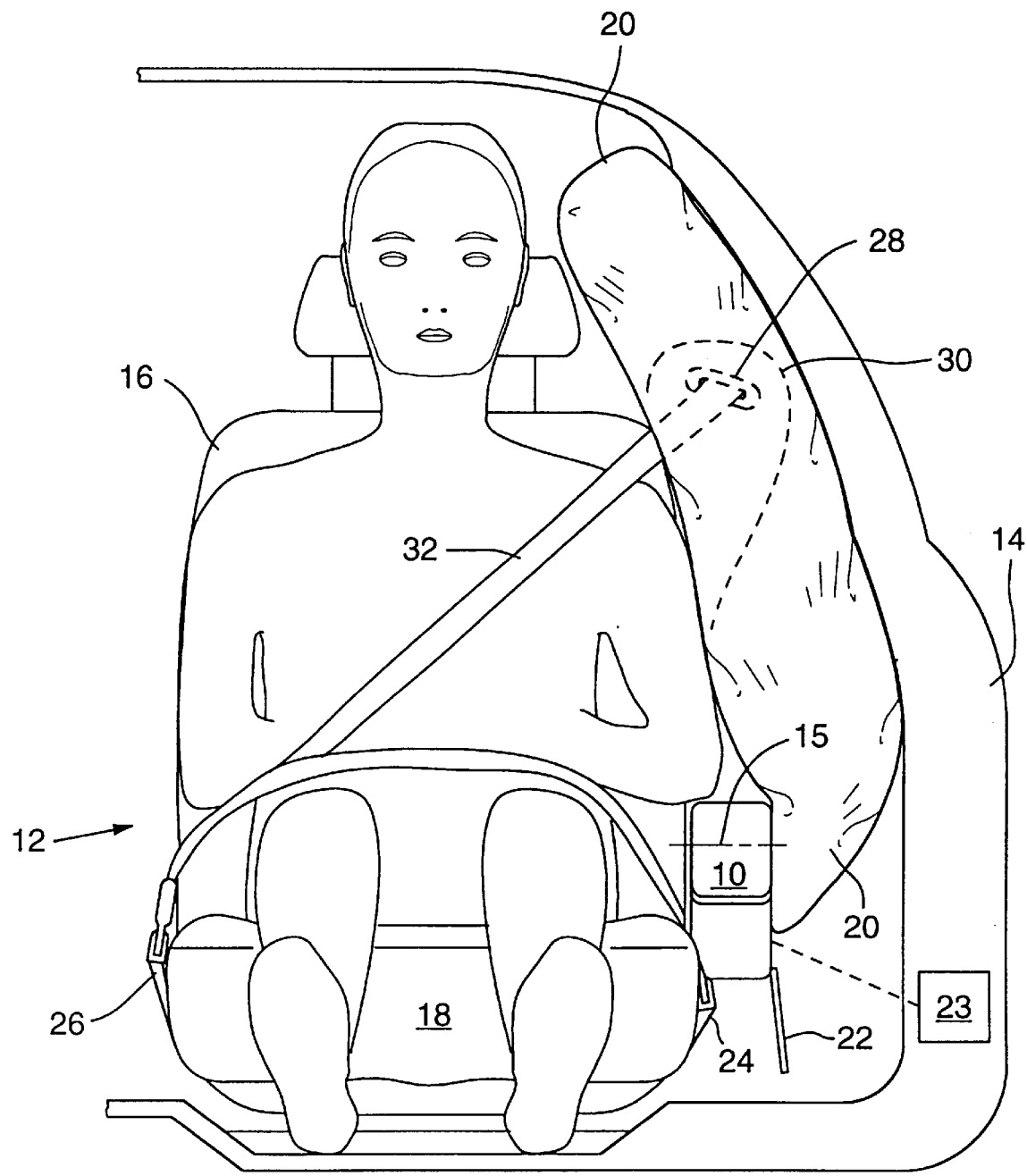
FIG. 3 is a front elevational view showing the inventive armrest with the air bag deployed.

Referring to FIGS. 1–3, the preferred embodiment of the inventive armrest 10 is shown in conjunction with a driver's seat 12. Installation of the armrest on a passenger seat would result in mirror-images of these figures. The armrest can also be used in a similar manner with the rear seats of a vehicle.

Referring to FIG. 3, armrest 10 is mounted to the outboard side of seat 12, between the vehicle occupant and vehicle door 14. The present invention can be used with a conventional vehicle door or in conjunction with a vertically sliding door. The advantages and design of a vertically sliding door are fully described in original application Ser. No. 07/912,790, filed Jul. 13, 1992, issued as U.S. Pat. No. 5,378,036 on Jan. 3, 1995.

Referring to FIG. 1, armrest 10 is preferably pivotably mounted to the back rest 16 of seat 12. As shown, armrest 10 operates as a conventional armrest when the vehicle occupant is seated. To allow for easy ingress and egress, armrest 10 preferably pivots about pivot axis 15 into a retracted position up along side of back rest 16 (shown in phantom), or alternatively down adjacent to the seat bottom 18. Armrest movement between the retracted and operative positions can be driven manually or automatically. The advantages and design of a retracting outboard armrest, and how it can be used to present a restraint belt buckle to a vehicle occupant, are fully described in a related patent application, Ser. No. 08/477,200, filed Jun. 7, 1995, incorporated herein by reference.

Air bag 20 (not shown in its stowed position in FIG. 1, but shown deployed in FIGS. 2 and 3) is located within armrest 10, preferably towards the rear of armrest 10 adjacent to the occupant's hip. Cover panel 22 protects air bag 20 when not in use in its stowed position.

Referring to FIGS. 2 and 3, the deployment of air bag 20 will now be described. An impact sensor 23, well known in the art, can be located in the armrest, door 14, or elsewhere on the vehicle and triggers the deployment of air bag 20 when a collision having a lateral component is sensed. A gas generator (not shown but well known in the art) is energized to inflate air bag 20. At the same time, cover panel 22 can be released by an electronic latch (not shown) which would inhibit tampering with air bag 20 when not in use. Alternatively, cover panel 22 can be pushed open by the thrust of the expanding air bag 20. Preferably, cover panel 22 is hingedly connected along its bottom edge to armrest 10 to allow cover panel 22 to pivot outward and downward, allowing air bag 20 to upwardly expand without restriction. Alternatively, cover panel 22 can be held in place entirely by detents (not shown) when air bag 20 is stowed, and pushed completely clear of the opening by the force of the deploying air bag 20. A cover panel is not required for operation of the present invention. As shown and described in the alternative embodiments below, the air bag may be deployed through a slit in the armrest covered with fabric, instead of the aperture and cover panel described above.

Referring to FIG. 3, air bag 20 emerges from armrest 10 in an outwardly direction. Because the deploying air bag is not aimed at the occupant, the risk of deployment injury is minimized. Also, since air bag 20 is deployed against the smooth, predictable, interior surface of door 14, there is little chance of air bag 20 getting caught on anything as it extends up towards the occupant's head. Because armrest 10 is provided on seat 12 rather than on door 14, there is no need for protrusions or recessed areas in door 14. If a vertically sliding door is used, door levers are eliminated and door and window buttons can be located on a dashboard or console, leaving the interior surface of door 14 free of obstructions.

After air bag 20 is deployed against the interior of door 14, it extends quickly upward along the door to a fully deployed position where air bag 20 can protect the occupant's torso during a side impact, and preferably extends up to the occupant's head to protect it as well. In the preferred embodiment, air bag 20 is fully deployed 22 milliseconds after sensor 23 senses a side impact.

Because air bag 20 is deployed outwardly, armrest 10 is located between the occupant's hip and air bag 20 during a collision. Accordingly, armrest 10, including its internal structure and that of any air bag stowing canister (not shown), should be designed to be collapsible to absorb energy during a collision, or at least not contain parts that will cause injury if the occupant is thrown against it. Preferably, armrest 10 includes progressively deformable material where space allows to provide protection during any degree of collision.

For the present invention to work properly during a collision, armrest 10 obviously should be in the operative position shown in the figures and not in the retracted position (shown in phantom). A suitable interlock device or warning system should be used, especially if the armrest is configured to be moved manually, to prevent the vehicle from being driven with the armrest in the retracted position.

It is preferable if armrest 10 of the present invention is built into a seat having a fully integrated restraint system as shown. In such a seat the lower belt anchor point 24 and buckle latching mechanism 26 are securely attached to the lower structure of seat 12 rather than to the floor of the vehicle as are conventional restraint belt systems. Also, belt reel and tensioner unit 28 is integrated into seat appendage 30 rather than being mounted in the vehicle roof or B-pillar. Air bag 20 is less likely to hang up on shoulder belt 32 when belt and reel tensioner 28 is located in seat 12 rather than directly on the vehicle. Further advantages to integrating a restraint belt system into the seat are fully described in related patent application Ser. No. 08/477,200, filed Jun. 7, 1995. The restraint belt system works in a conventional manner and should be used in conjunction with the air bag system.

Referring to FIG. 4a, a first alternative embodiment of the inventive armrest is shown, both before and after installation on seat 36. In this embodiment, the armrest 34 is a separate unit that can be manufactured-to attach to an existing seat 36. Armrest 34 is preferably pivotably mounted to an attachment arm 38 about pivot axis 15. Attachment arm 38 fits around the back side of seat back rest 40 to hold armrest 34 in place relative to seat 36. Preferably, bolts 39 fasten arm 38 onto tubing 46 which makes up the interior framework of back rest 40. Alternatively, arm 38 can be made from a resilient material and be sized smaller than back rest 40 to provide a "snap fit" around the rear side of back rest 40. Another method that can be employed to attach arm 38 to back rest 40 involves providing arm 38 with an adjustable length (not shown) to allow arm 38 to be clamped around back rest 40 and then tightened to secure the length of arm 38.

Armrest 34 is constructed with an offset, central spar 68 that partitions the armrest into a rear cavity 70 and a front cavity 72. Rear cavity 70 is unobstructed by spar 68 in the outboard direction, and front cavity 72 is unobstructed by spar 68 in the inboard direction. Rear cavity 70 houses air bag 44 and gas generator 42, while front cavity 72 houses a progressively deformable bolster 74. Bolster 74 absorbs lateral energy to cushion the outboard hip of an occupant during a side impact. What is meant by progressively deformable is that the bolster contains different regions which each compress at a different rate to absorb increasing levels of impact energy. In this way, bolster 74 can provide effective cushioning during both low inertia and high inertia collisions.

Spar 68 is preferably made from steel, and is designed to be stiff enough to provide a stable mounting for air bag 44 for proper deployment, yet forgiving enough so as not to injure the occupant during a collision. Spar 68, air bag 44, generator 42 and bolster 74 are preferably covered with a soft plastic housing having a top 76 and a bottom 78.

A side impact sensor 23 can be located within armrest 34. This first alternative embodiment functions much like the preferred embodiment described above and shown in FIGS. 1–3. Instead of deploying the air bag through a large aperture which is covered by a movable cover panel 22 when not in use, a narrow slit 41 the length of rolled-up air bag 44 can be formed in the structure of the outboard side of armrest 34 and covered with fabric. The expanding energy of rolled-up air bag 44 when deployed is sufficient to force air bag 44 through slit 41 and to rip apart the upholstery covering slit 41. Slit 41 can be ¼ inch wide, or narrower if desired.

Motor 43 can be used to automatically raise and lower armrest 34. For example, motor 43 can be triggered by the opening and closing of door 62 to raise and lower armrest 34, respectively. An interlock switch should be utilized to ensure that armrest 34 is lowered when the vehicle is driven so that air bag 44 will deploy from the proper position.

Referring to FIG. 4b, the deployment of air bag 44 is shown. In operation, sensor 23 activates gas generator 42 upon a side impact to inflate air bag 44. Air bag 44 deploys outward from armrest 34 through slit 41 and anything covering slit 41, outward against vehicle door 62 (or other interior body panel), and expands upward along door 62 (or body panel), as shown by arrow A.

Figure 4C:
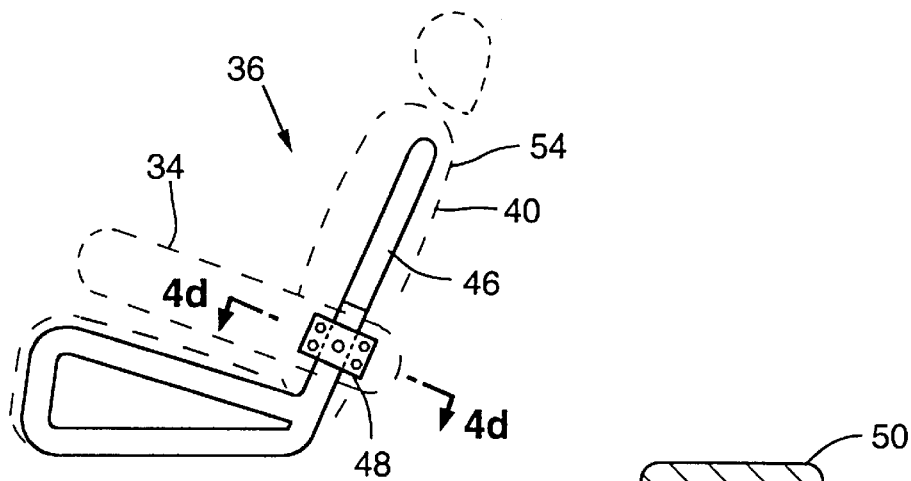
FIG. 4c is a side elevational view showing a first variation of the first alternative embodiment.
Figure 4D:
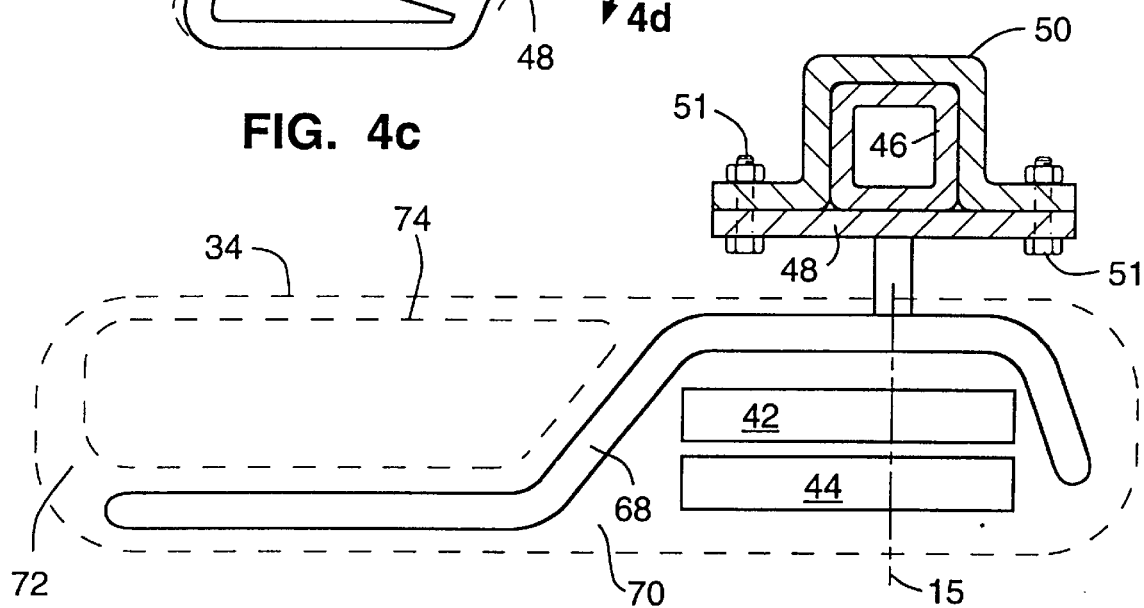
FIG. 4d is an enlarged cross-sectional view taken along line 4d—4d in FIG. 4b showing the first variation to the first alternative embodiment.
Figure 4E:
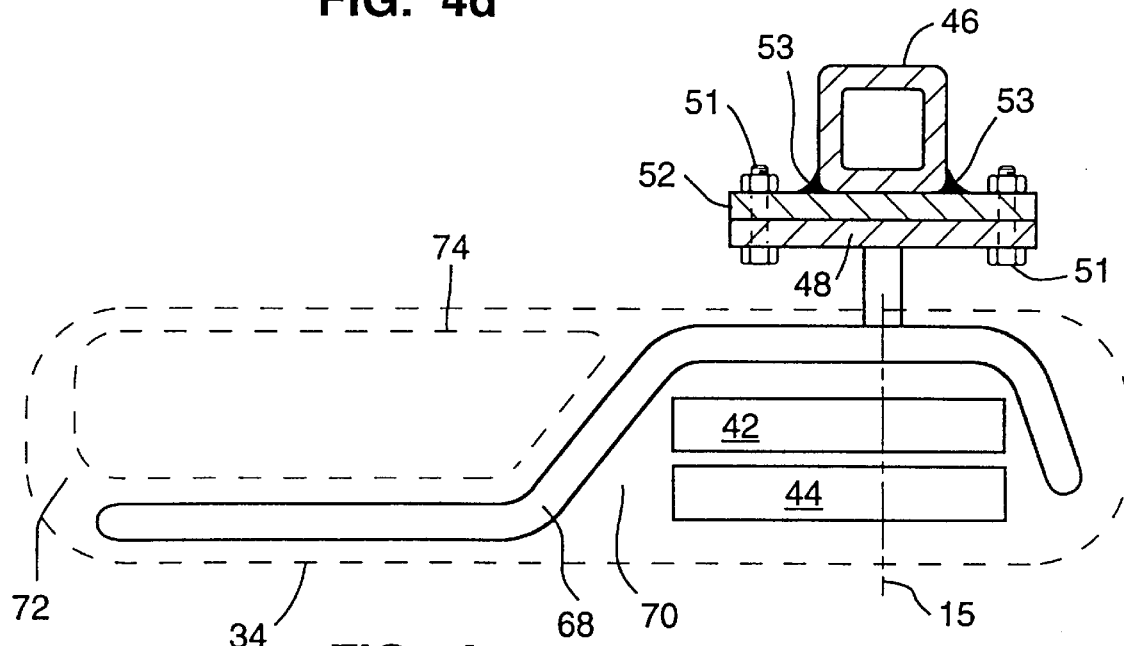
FIG. 4e is an enlarged cross-sectional view similar to FIG. 4d showing a second variation to the first alternative embodiment.

Referring to FIGS. 4c–4e, variations to the first alternative embodiment described above are shown. These variations allow armrest 34 to be attached directly to the internal framework tubing 46 within seat 36 without using external arm 38, and while allowing armrest 34 to remain a separate, detachable unit. Armrest 34 includes a mounting plate 48, preferably having four bolt holes therethrough. As shown in FIG. 4d, armrest mounting plate 48 is fastened to clamp bracket 50 with four bolts 51 to secure seat tubing 46 therebetween. Alternatively, as shown in FIG. 4e, an attachment plate 52 can be welded to tubing 46 with welds 53 by the original equipment manufacturer of seat 36, or by a third party adding armrest 34. Armrest 34 can then be fastened to attachment plate 52 with four bolts 51 as shown. In both variations, seat cover 54 can be temporarily removed while armrest 34 is being attached.

Figure 5B:
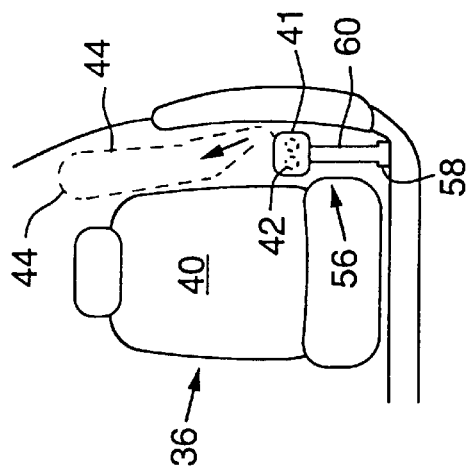
FIG. 5b is a reduced front elevational view showing the second alternative embodiment.
Figure 5A:
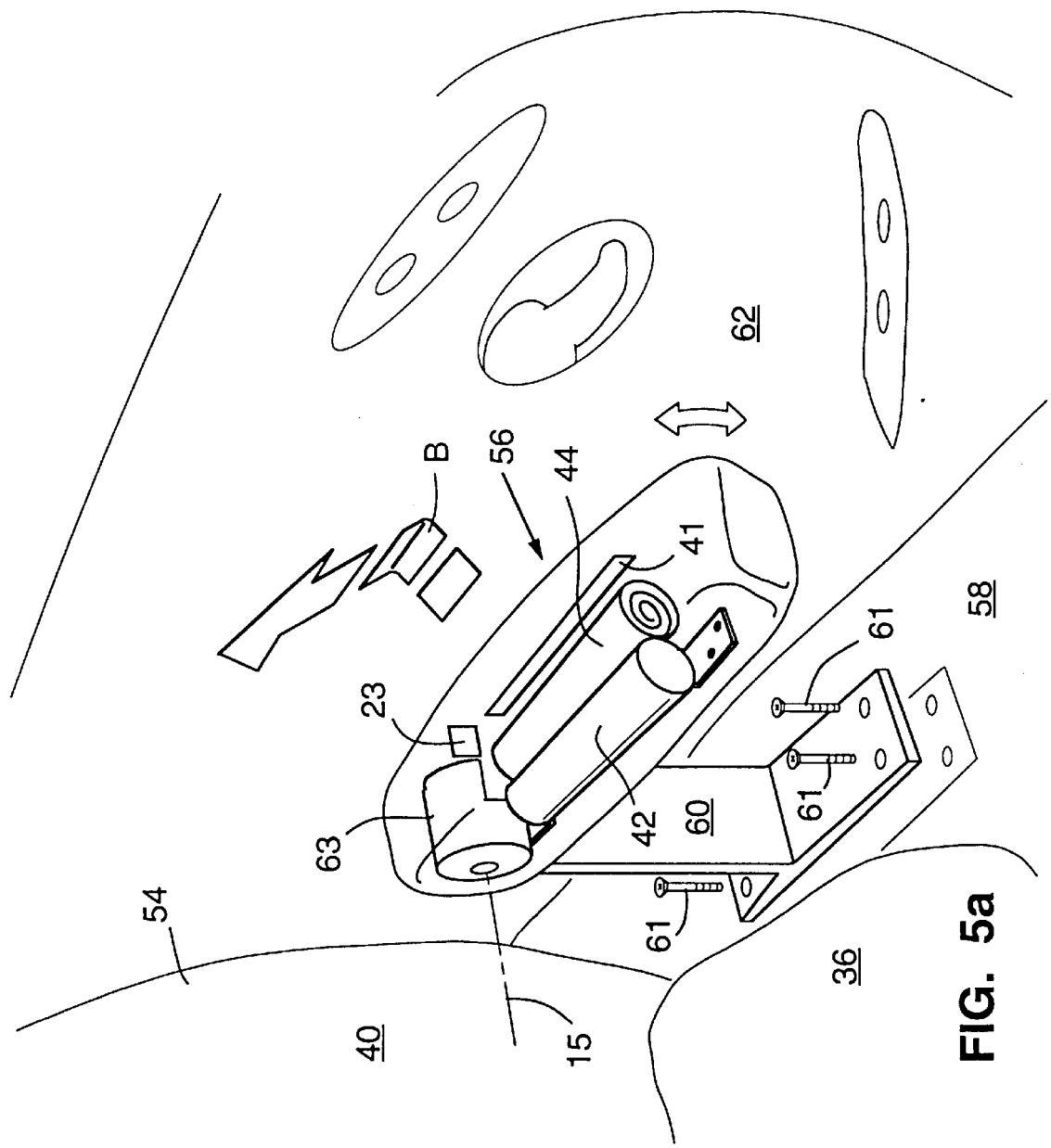
FIG. 5a is a perspective view showing a second alternative embodiment, with parts shown in exploded perspective and the skin of the armrest shown semi-transparent to enable internal viewing of its structure.

Referring to FIG. 5a and 5b, a second alternative embodiment of the inventive armrest is shown. Separate armrest 56 is mounted to the vehicle floor 58 by mounting bracket 60 and bolts 61. Armrest 56 is positioned adjacent to the outboard side of seat 36 such that a vehicle occupant in seat 36 may use it as an outboard armrest. Preferably, armrest 56 is pivotably mounted to bracket 60 on axis 15 so that armrest 56 can be raised to facilitate entry to and egress from the vehicle through door 62. A motor 63 can be located in armrest 56 to automatically raise and lower armrest 56, as described above.

As in other embodiments, air bag 44 and preferably gas generator 42 and impact sensor 23 are located within armrest 56. Air bag 44 is deployed outward through slit 41 and against door 62 (or a non-opening interior portion of the vehicle side) and expands upward along the same during a side impact, as shown by arrow B.

Figures 6A, 6B:
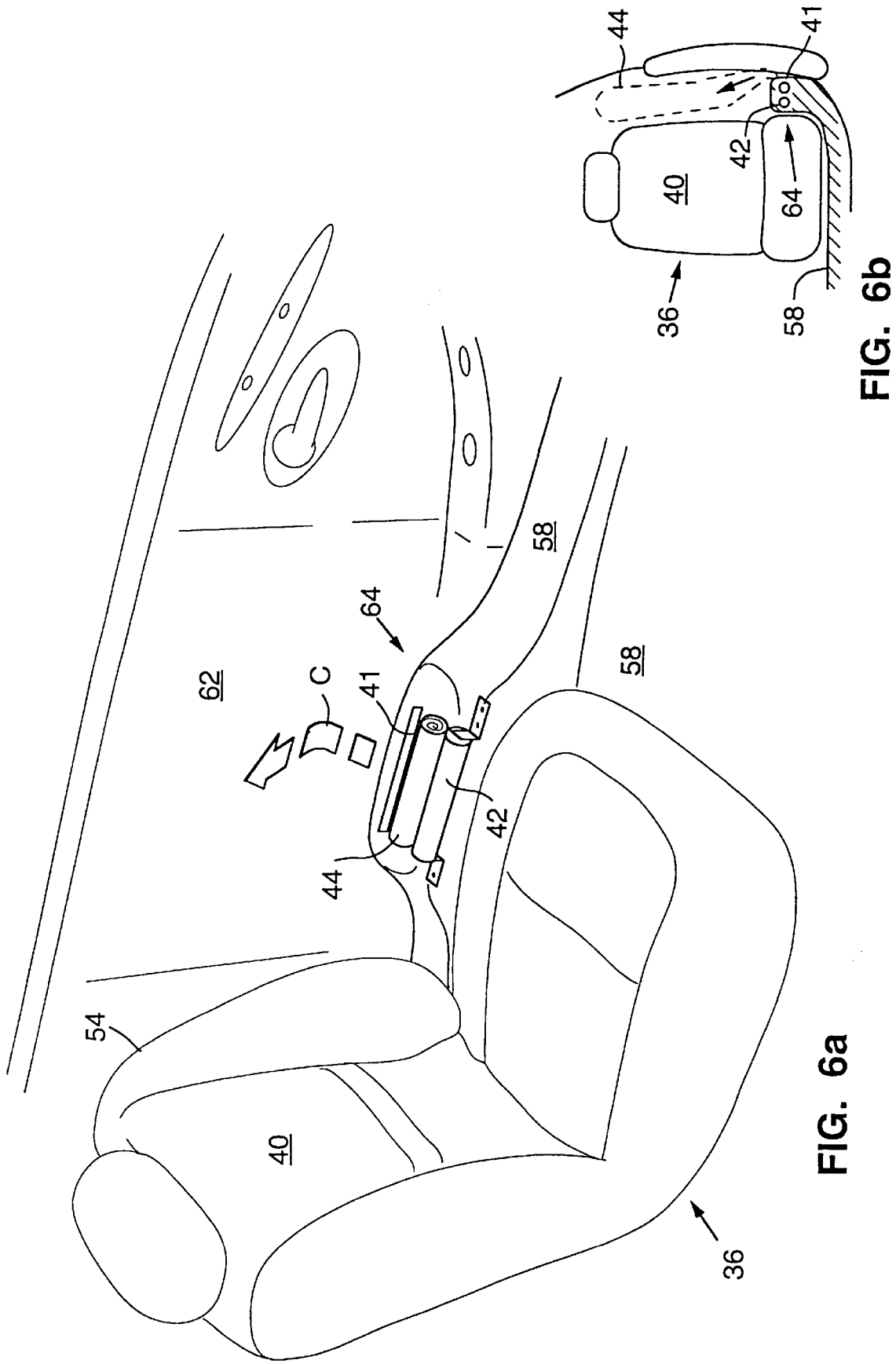
FIG. 6a is a perspective view showing a third alternative embodiment, with the skin of the armrest shown semi-transparent to enable internal viewing of its structure.
FIG. 6b is a reduced front elevational view showing the third alternative embodiment.

Referring to FIGS. 6a and 6b, a third alternative embodiment of the inventive armrest is shown. Armrest 64 is formed on vehicle floor 58 adjacent to the outboard side of seat 36, and houses air bag 44 and gas generator 42. Preferably, the foundation of armrest 64 is a stamped, sheet metal shell formed integrally with floor 58, as is common in "unibody" vehicle construction. Alternatively, a separate housing can be constructed and attached to floor 58 underneath floor carpeting.

Air bag 44 is deployed from the outboard side of armrest 64 through slit 41 against door 62 and expands upward along door 62, as shown by arrow C and described above.

Referring to FIGS. 7a and 7b, a fourth alternative embodiment of the inventive armrest is shown. A generally C-shaped armrest 66 is attached to the inside surface of door 62 in a conventional manner with two bolts 67. Air bag 44 is located within armrest 66 and deploys outward through slit 41 and against door 62 and expands upward along door 62, as shown by arrow D. Preferably, pocket 80 which is formed between armrest 66 and door 62 is closed by armrest 66 on the bottom to ensure that air bag 44 deploys upward.

In all of the above embodiments, by deploying air bag 44 away from the occupant outward against door 62 (or interior of the vehicle side) and allowing air bag 44 to expand upward along door 62 (or interior of the vehicle side), chance of injury to the occupant is minimized and a more reliable deployment of air bag 44 is achieved.

The above descriptions and drawings are for illustrative purposes only, and are not exhaustive of possible alternate embodiments of the invention. It is to be understood that the present invention is not limited to the sole embodiments described above and illustrated herein, but encompasses any and all variations falling within the scope of the appended claims.

What is claimed as the invention is:

1. An air bag restraint apparatus for use in a vehicle having a body and a seat within the body, the body having a floor portion and a side portion, said apparatus arranged for protecting a vehicle occupant and comprising:

a housing formed in the floor portion adjacent to an outboard side of the vehicle seat, said housing having inboard and outboard sides; and an air bag stowed within the housing for deployment through the outboard side thereof into a space between the outboard side of the housing and the side portion of the vehicle body, wherein the air bag deploys outward against the side portion and expands upward along the side portion to protect the occupant from side impact.

* * * * *